(12) United States Patent
Hyun et al.

(10) Patent No.: US 11,710,963 B2
(45) Date of Patent: Jul. 25, 2023

(54) POWER CONDITIONING SYSTEM AND METHOD

(71) Applicant: LG Electronics Inc., Seoul (KR)

(72) Inventors: Seung Wook Hyun, Seoul (KR); Chang Jin Lim, Seoul (KR); Sun Young Park, Seoul (KR); Jungmin Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 16 days.

(21) Appl. No.: 17/154,292

(22) Filed: Jan. 21, 2021

(65) Prior Publication Data

US 2022/0069576 A1 Mar. 3, 2022

(30) Foreign Application Priority Data

Sep. 3, 2020 (KR) .................. 10-2020-0112067

(51) Int. Cl.
*H02J 3/00* (2006.01)
*H02J 3/46* (2006.01)
*H02J 3/40* (2006.01)

(52) U.S. Cl.
CPC ............. *H02J 3/0012* (2020.01); *H02J 3/40* (2013.01); *H02J 3/46* (2013.01)

(58) Field of Classification Search
CPC .... H02J 3/0012; H02J 3/40; H02J 3/46; H02J 2203/10; H02J 3/001; H02J 3/241; H02J 3/32; H02J 3/388; H02J 3/381; H02J 9/06; Y04S 20/12
USPC .......................................................... 700/286
See application file for complete search history.

(56) References Cited

U.S. PATENT DOCUMENTS

| 2005/0135031 | A1* | 6/2005 | Colby | ............... | H02M 7/53832 361/78 |
| 2017/0005473 | A1* | 1/2017 | Somani | .................... | H02J 3/381 |
| 2021/0194250 | A1* | 6/2021 | Zhang | .................... | H02J 3/388 |
| 2022/0006133 | A1* | 1/2022 | Nasuno | ............... | H01M 10/486 |

* cited by examiner

*Primary Examiner* — Richard Tan
(74) *Attorney, Agent, or Firm* — Fish & Richardson P.C.

(57) ABSTRACT

A power conditioning system (PCS) includes: a grid blackout determiner, a voltage controller, and a processor electrically connected to the grid blackout determiner and the voltage controller. The processor is configured to identify a state of a grid as a blackout state or an unstable state based on at least one of an amplitude or a frequency of a voltage of the grid that is detected by the grid blackout determiner, control the voltage controller to adjust, based on the identified state of the grid being the blackout state or the unstable state, load voltage input to the voltage controller to be equal to a command voltage, and adjust, based on the identified state of the grid being the blackout state or the unstable state, a first frequency of the detected voltage of the grid to a second frequency that is different from the first frequency.

17 Claims, 7 Drawing Sheets

POWER CONDITIONING SYSTEM AND METHOD

CROSS-REFERENCE TO RELATED APPLICATION

This application claims priority to and the benefit of Korean Patent Application No. 10-2020-0112067, filed on Sep. 3, 2020, the disclosure of which is incorporated herein by reference in its entirety.

BACKGROUND

1. Field of the Disclosure

The present disclosure relates to a power conditioning system (PCS) and a power conditioning method.

2. Description of Related Art

An energy storage system (ESS) may charge power when load power consumption is low and discharge the charged power when load power consumption is high, to perform a peak power sharing function. The ESS may be installed and operated for reducing power variation, which blocks renewable energy generation.

In addition, the ESS may perform a power distribution function for independently supplying power to a load according to requests of consumers if accidents (or power failure) occur in a grid. In addition, the ESS performing the independent function may be a substitute for an emergency generator and may be included in a micro grid configured to supply power to an electrically-isolated area.

However, developing customized products by ESS-producing companies according to all customer requirements may be inefficient, and in some cases, it may be impossible. Accordingly, the ESS-producing companies may add a parallel operation function for a single product to respond to the market with various capacity requirements.

The parallel operation control method may include a parallel operation control method based on communication and a parallel operation control method based on non-communication. The parallel operation control method based on the communication may include a master-slave control method. The master-slave control method may include calculating an amount of each of grid power and load power by a master ESS (or a master board) and receiving power command through communication by a slave ESS.

In the master-slave control method, the slave ESS may receive the power command executed by each of ESSs relatively quickly and accurately; however, if communication-related problems occur, the system may have difficulty in performing the operation thereof because the operation of the ESS is highly dependent on communication.

The parallel operation control method based on the non-communication includes a droop control method of sharing active power and reactive power by adjusting amplitude and frequency of voltage on a power line. In the droop control method, inverters of a large-sized micro grid may be connected to one another in parallel without communication lines and may each easily share load. However, the droop control method has a recovery time of voltage in a transient state that is slower than that of the master-slave control method because the droop control method has high dependence on voltage at the power line and has voltage deviation and frequency deviation occurring based on changes in an amount of load.

In the parallel operation control method based on the non-communication, the micro grid may identify power failure based on the output voltage amplitude and frequency of each of ESSs. If a grid breaker is opened and the power failure occurs, a difference between an amount of load of the micro grid and an amount of command power of the ESS is generated. In addition, the load voltage is instantaneously decreased and increased and each ESS operates in an islanding state. Using seamless technology, a grid-connected power control operation mode may be switched to an independent operation voltage control operation mode when the islanding state is detected. In this case, each of the ESSs may relatively sensitively detect the power failure based on deviation in a manufacturing process in comparison to other ESSs. The above operation is configured due to a deviation in a ratio of a number of turns of the transformer disposed between the ESS and the micro grid. Based on the deviation in the ratio of the number of turns, the transformer designed to have a same ratio of the number of turns has 3 to 5% of process deviation.

When the deviation of the voltage for identifying the power failure occurs based on the process deviation, if the power failure occurs, the ESS sensitive to the power failure detection may identify the independent operation state. In this case, the ESS having the operation mode switched to independent operation mode increases load voltage amplitude and the other ESSs may not detect the power failure state.

Accordingly, there is a need for power failure detection synchronization among the plurality of ESSs of the micro grid.

SUMMARY OF THE DISCLOSURE

In related art, power failure detection synchronization may not be performed among a plurality of energy storage systems (ESSs) of a micro grid.

The present disclosure provides the power failure detection synchronization among the plurality of ESSs of the micro grid.

In addition, according to the present disclosure, provided are a power conditioning system (PCS) and a power conditioning method. The PCS and the power conditioning method enable converting grid voltage frequency to another grid voltage frequency to detect the power failure by at least one other ESSs adjacent to the ESS that has detected the power failure under control of the at least one ESS that has detected the power failure.

In addition, according to the present disclosure, provided are the PCS and the power conditioning method. The PCS and the power conditioning method enable applying voltage having adjusted frequency through a power line to detect the power failure by the at least one other ESSs adjacent to the at least one ESS that has detected the power failure under the control of the at least one ESS that has detected the power failure.

In addition, according to the present disclosure, provided are the PCS and the power conditioning method. The PCS and the power conditioning method enable applying, by the at least one ESS that has detected the power failure, the power having the adjusted frequency through the power line and operating in an independent operation mode.

In addition, according to the present disclosure, provided are the PCS and the power conditioning method. The PCS and the power conditioning method may enable independently operating the at least one ESS based on the frequency of the voltage applied through the power line.

The objects of the present disclosure are not limited to the above-mentioned objects, and other objects and advantages of the present disclosure which are not mentioned may be understood by the following description and more clearly understood based on the embodiments of the present disclosure. It will also be readily understood that the objects and the advantages of the present disclosure may be implemented by features defined in claims and a combination thereof.

According to the present disclosure, the at least one PCS identifies whether the grid is currently in a power failure state or an unstable state based on grid voltage or grid frequency and notifies at least one adjacent PCSs of the power failure state or the unstable state of the grid to synchronize power provision modes corresponding to the power failure state or the unstable state among the plurality of PCSs of a micro grid.

In addition, according to the present disclosure, the PCS may include a processor configured to detect at least one of grid voltage or grid frequency and adjust first frequency of the grid voltage to second frequency.

In addition, according to the present disclosure, the PCS may include the processor configured to generate voltage having frequency for identifying that the grid is in the power failure state or the unstable state, by the at least one other PCSs adjacent to the PCS.

In addition, according to the present disclosure, the PCS may include the processor configured to calculate a time period for which the PCS is operated at the frequency and control the PCS to be independently operated at rated frequency of at least one load electrically connected to the PCS based on the calculated time period being exceeding a predetermined threshold time period.

In addition, according to the present disclosure, the PCS may include the processor configured to, based on identifying that the grid power is restored while the PCS is independently operating at rated frequency; electrically connect the power controller to the current controller and electrically connect the grid phase detector to the three-phase command voltage generator.

In addition, a method for conditioning power, by a power conditioning system (PCS), according to the present disclosure may include identifying whether a grid is in a power failure state or an unstable state based on at least one of amplitude or frequency of grid voltage and driving the PCS by adjusting a first frequency of the grid voltage to a second frequency, and the second frequency is different from the first frequency.

In addition, the method according to the present disclosure may further include generating three-phase command voltage having the second frequency to identify that the grid is in the power failure state or the unstable state by at least one other PCSs adjacent to the PCS.

According to the present disclosure, the detection of the power failure state or the unstable state may be synchronized among the plurality of PCSs of the micro grid to supply stable power to at least one load of the micro grid.

In addition, according to the present disclosure, when one of the plurality of PCSs of the micro grid operating in the non-communication parallel operation mode may switch a mode from a grid-connection mode to a seamless mode, the others of the plurality of PCSs that cannot switch the modes may switch modes thereof.

In addition, according to the present disclosure, the PCS may identify a power failure state or an unstable state of the grid based on at least one of amplitude or frequency of grid voltage, control the voltage controller to control voltage for adjusting load voltage to be equal to command voltage, and adjust first frequency of the grid voltage to second frequency, the second frequency being different from the first frequency, to identify the power failure state or the unstable state by the at least one other PCSs adjacent to the PCS under the control of the PCS.

In addition, according to the present disclosure, the PCS generates three-phase command voltage having the second frequency and applies the three-phase command voltage having the second frequency to the power line in order for the at least one of other PCSs adjacent to the PCS to identify that the grid is in the power failure state or the unstable state under the control of the PCS. Therefore, the other PCSs may quickly identify the power failure state or the unstable state.

In addition, according to the present disclosure, the PCS may identify that the grid is in the power failure state or the unstable state based on the amplitude of the grid voltage having a value corresponding to a predetermined range of amplitude of reference rate voltage. Therefore, the PCS may accurately identify the power failure or stability of the grid.

In addition, according to the present disclosure, the PCS may be configured to control the grid power failure determiner to identify that the grid is in the power failure state or the unstable state based on identifying that the grid voltage has an amplitude value being outside of a predetermined amplitude range of reference rated voltage. Therefore, the PCS may accurately identify the power failure or stability of the grid.

In addition, according to the present disclosure, the PCS may be configured to control the grid power failure determiner to identify that the grid is in the power failure state or the unstable state based on the frequency of the grid voltage being outside of a predetermined range. Therefore, the PCS may accurately identify the power failure or the non-power failure of the grid.

In addition, according to the present disclosure, the PCS may be configured to calculate a time period for which the PCS is operated at the second frequency and be independently operated at rated frequency of at least one load electrically connected to the PCS based on the calculated time period being exceeding a predetermined threshold time period. Therefore, the PCS may quickly provide the load with the power based on the power failure state or the unstable state of the grid.

In addition, according to the present disclosure, the PCS is configured to, based on identifying that the grid power is restored while the PCS is independently operating at rated frequency, to electrically connect the power controller to the current controller and electrically connect the grid phase detector to the three-phase voltage generator to quickly receive the power from the grid.

Hereinafter, further effects of the present disclosure, in addition to the above-mentioned effect, are described together while describing specific matters for implementing the present disclosure.

DETAILED DESCRIPTION OF EXEMPLARY IMPLEMENTATIONS

Figure 1:
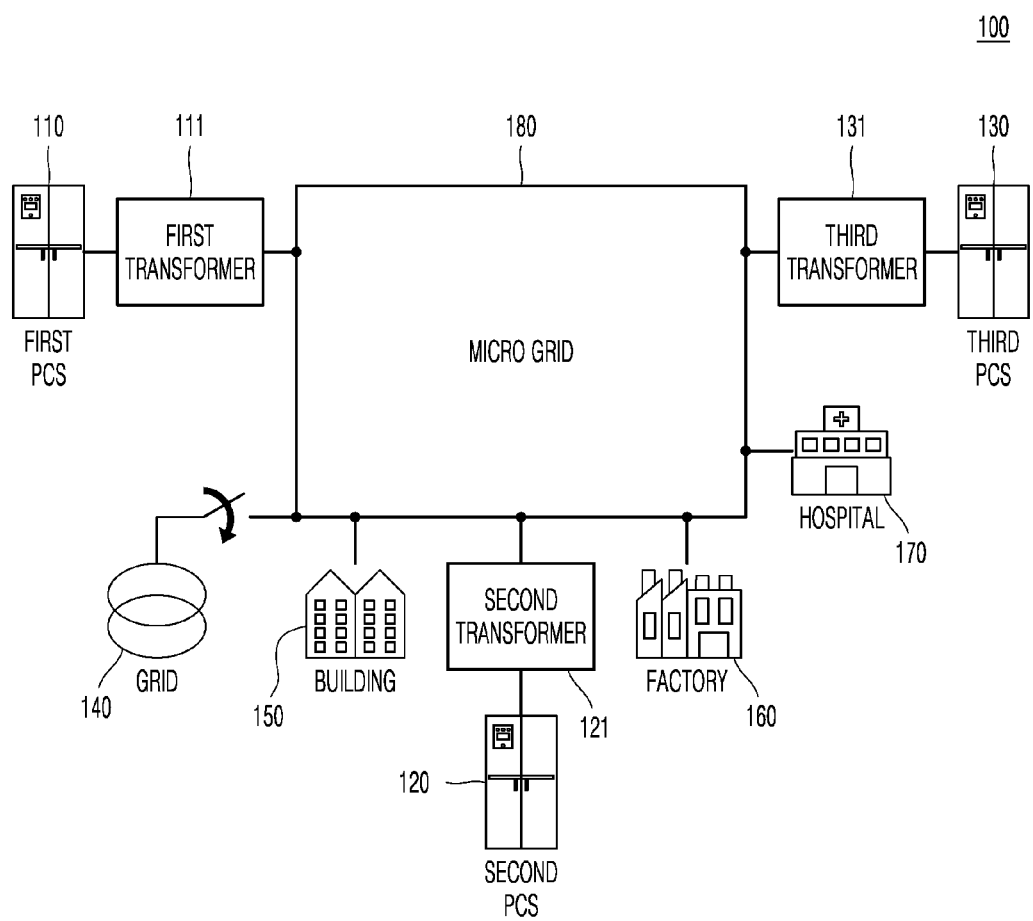
FIG. 1 is an exemplary diagram showing an example system configured to synchronize power failure detection among power conditioning systems (PCSs).

Some embodiments of the present disclosure are described in detail with reference to the accompanying drawings, such that a person having ordinary knowledge in the art to which the present disclosure pertains may easily implement the technical idea of the present disclosure. In the description of the present disclosure, a detailed description of the known technology relating to the present disclosure may be omitted if it unnecessarily obscures the gist of the present disclosure. Hereinafter, one or more embodiments of the present disclosure are described in detail with reference to the accompanying drawings. Same reference numerals may be used to refer to same or similar component in the figures.

In some examples, terms such as first, second, and the like may be used herein when describing elements of the present disclosure, but the elements are not limited to those terms. These terms are intended to distinguish one element from other elements, and the first element may be a second element unless otherwise stated.

In this document, the terms "upper," "lower," "on," "under," or the like are used such that, where a first component is arranged at "an upper portion" or "a lower portion" of a second component, the first component may be arranged in contact with the upper surface (or the lower surface) of the second component, or another component may be disposed between the first component and the second component. Similarly, where a first component is arranged on or under a second component, the first component may be arranged directly on or under (in contact with) the second component, or one or more other components may be disposed between the first component and the second component.

Further, the terms "connected," "coupled," or the like are used such that, where a first component is connected or coupled to a second component, the first component may be directly connected or able to be connected to the second component, or one or more additional components may be disposed between the first and second components, or the first and second components may be connected or coupled through one or more additional components.

Unless otherwise stated, each component may be singular or plural throughout the disclosure.

As used herein, the singular forms "a," "an" and "the" are intended to include the plural forms as well, unless the context clearly indicates otherwise. In the present disclosure, it should not be construed that terms such as "including" or "comprising" necessarily include various types of components or various steps described in the present disclosure, and it should be construed terms such as "including" or "comprising" do not include some components or some steps or may include additional components or steps.

In the present disclosure, unless otherwise stated, "A and/or B" means A, B or A and B. Unless otherwise stated, "C to D" means "C or more and D or less".

Hereinafter, power conditioning system and method according to some embodiments of the present disclosure are described.

FIG. 1 is an exemplary diagram showing an example system configured to synchronize power failure detection among power conditioning systems.

Referring to FIG. 1, a system 100 configured to synchronize power failure detection among power conditioning systems according to an embodiment of the present disclosure may include a grid 140 configured to supply power, at least one load 150, 160, and 170 configured to receive power from the grid 140, at least one power conditioning system 110, 120, and 130 configured to supply power to the at least one load 150, 160, and 170 when the power supply from the grid 140 is blocked, and at least one transformers 111, 121, and 131 configured to change power received from the power conditioning systems.

The configuration of the system 100 configured to synchronize power failure detection among the power conditioning systems shown in FIG. 1 is according to an embodiment, components of the system 100 configured to synchronize power failure detection among the power conditioning systems are not limited to examples shown in FIG. 1, and some components may be included, changed, or excluded as necessary.

According to an embodiment, the system 100 configured to synchronize power failure detection among the power conditioning systems may include a power line 180 for transmitting power and a power control signal among loads 150, 160, and 170 and power conditioning systems 110, 120, and 130. The power line 180 may be connected to each of loads 150, 160, and 170, and each of power conditioning systems 110, 120, and 130.

According to an embodiment, the power conditioning system may be included in an energy storage system (ESS). For example, the ESS may include the power conditioning system, an energy management system (EMS), a plurality of batteries, and a battery management system (BMS). In addition, the plurality of batteries may be arranged in parallel.

According to an embodiment, the ESS is an energy storage device configured to store power generated by a power plant and transmit the stored power when a load has insufficient power. The ESS may improve power use efficiency by storing idle power and supplying the power during peak demand times.

For example, the ESS stores renewable energy having sources such as solar and wind power in advance, which has difficulty in generating power in desired times, and uses the renewable energy as necessary, thereby enhancing utility of next-generation energy. The ESS is not a single device, but may include the battery, the power conditioning system, the EMS, the BMS, and the plurality of batteries.

According to an embodiment, the EMS may monitor, control an operation of the ESS, and control an overall system. The EMS may analyze the ESS in real time and monitor and control the ESS through a communication network.

For example, the EMS may simply control charging or discharging or predict power demand or an amount of power generation by establishing an algorithm for consumption patterns or weather information, thereby making optimal operation plans.

According to an embodiment, the battery of the ESS stores power. A cell of the battery may include a cathode, an anode, an electrolyte, and a separator.

According to an embodiment, the BMS optimizes battery performance and controls the battery to be safely used. The BMS may be installed for each unit (e.g., a cell/a module/a rack/a system) of the battery. In addition, the BMS monitors the state information of the battery and transmits a result value to EMS, thereby improving stability of the ESS system.

According to an embodiment, the power conditioning system (PCS) receives the power from the ESS and stores the power in the battery or converts characteristics of electricity such as frequency and voltage to transmit the power stored in the battery to a load. The PCS may change power characteristics, for example, converting alternating current (AC) into direct current (DC) (when the power is stored) and converting the DC to the AC (when the power is used).

For example, the PCS converts the AC into the DC when the power is stored in the battery and converts the DC into the AC when the stored power is transmitted. The PCS plays a key role of the ESS for monitoring an operation state and controlling quality of the ESS, performing grid protection in case of power failure, and performing an independent operation in addition to the power conditioning function.

Figure 2:
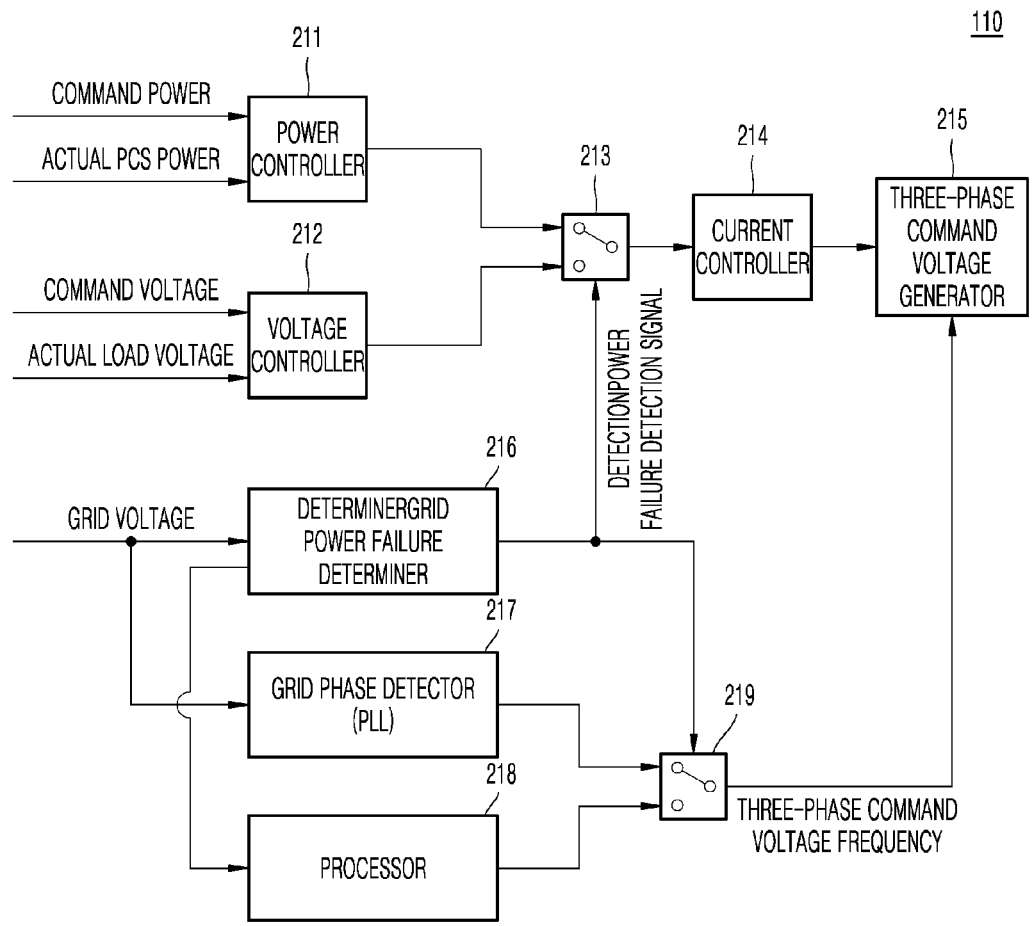
FIG. 2 is an exemplary view showing an example PCS.

FIG. 2 is an exemplary diagram showing an example PCS.

Referring to FIG. 2, a PCS 110 according to an embodiment of the present disclosure may include a power controller 211, a voltage controller 212, a first switch 213, a current controller 214, and a three-phase command voltage generator 215, a grid power failure determiner 216, a grid phase detector 217, a processor 218, and a second switch 219.

The configuration of the PCS 110 shown in FIG. 2 is according to an embodiment, the components of the PCS 110 are not limited to examples shown in FIG. 2, and some components may be included, changed or excluded as necessary.

According to an embodiment, the power controller 211 may receive the command power from the EMS. The command power is used to operate the PCS 110 and the PCS 110 may be operated based on the command power (e.g., 100 kw).

According to an embodiment, the power controller 211 controls a current sensor or a voltage sensor of the PCS 110 to obtain power (e.g., actual power) for actually operating the PCS 110 while the PCS 110 is operating.

According to an embodiment, the power controller 211 may perform power control to adjust the actual power to the command power and output the controlled power. The power controller 211 may adjust the actual power to be equal to the command power under the control of the processor 218. The power controller 211 may transmit the output power to the first switch 213.

According to an embodiment, the voltage controller 212 may receive command voltage from the EMS. The command voltage is used to operate the PCS 110 and the PCS 110 may be operated based on the command voltage (e.g., 220 V). The voltage controller 212 may receive, from the EMS, the command voltage (e.g., 220 V) having predetermined frequency (e.g., 60 Hz).

According to an embodiment, the voltage controller 212 may obtain actual load voltage measured at a load line while the PCS 110 is operating. The load voltage may include voltage consumed by the load connected to the power line 180. The voltage controller 212 may detect the actual load voltage of at least one load electrically connected to the PCS 110. In addition, the voltage controller 212 may perform the voltage control to adjust the actual load voltage to the command voltage (e.g., 220 V). In addition, the voltage controller 212 may transmit the controlled voltage to the first switch 213.

According to an embodiment, the output of the power controller 211 and the output of the voltage controller 212 may be transmitted to the current controller 214 by a switching operation of the first switch 213. The first switch 213 may be disposed at an output terminal of the power controller 211 and an output terminal of the voltage controller 212. When the grid power failure determiner 216 determines that the power failure occurs in the grid (or the grid is in an unstable state), the first switch 213 may receive, from the grid power failure determiner 216, a power failure detection signal indicating that the power failure occurs. In addition, the first switch 213 may operate the switching operation under the control of the processor 218 to electrically connect the voltage controller 212 to the current controller 214.

According to an embodiment, at least one of the power controller 211 or the voltage controller 212 may be electrically connected to the current controller 214 based on the switching of the first switch 213 and may transmit an output value (e.g., a power value or a voltage value) to the current controller 214.

According to an embodiment, the current controller 214 may receive the power (e.g., the power from the power controller 211 or the power from the voltage controller 212) based on the switching operation (e.g., a turn-on operation) of the first switch 213. The voltage controller 212 and the current controller 215 may each control output voltage output from a power conditioning module to receive the command voltage and supply voltage having predetermined frequency and magnitude to each of the loads 150, 160, and 170.

According to an embodiment, the voltage controller 212 and the current controller 214 each compare the command power for supplying to the loads 150, 160, and 170 with output voltage that is output and fed back from the power conditioning module. In addition, the voltage controller 212 and the current controller 214 may generate gate reference voltage, which refers to the output voltage following the command power. Further, the voltage controller 212 and the current controller 214 may each modulate the gate reference voltage using a pulse width modulation (PWM) signal and supply the modulated gate reference voltage to the inverter of the power conditioning module. The power conditioning module may convert DC power received from the BMS into AC power and supply the AC power to the load.

According to an embodiment, the grid power failure determiner 216 may analyze at least one of the amplitude or the frequency of the grid voltage (or the actual load voltage) to identify whether the grid is currently in the power failure state or the non-power failure state. The grid power failure determiner 216 detects the amplitude of the grid voltage, and when the detected amplitude of the grid voltage has a value outside of a predetermined amplitude range (e.g., 88% to 110%) of reference rated voltage, the grid power failure determiner 216 may identify that the power failure occurs in the grid. The grid power failure determiner 216 may transmit, to the processor 218, a signal indicating that the power failure occurs in the grid. According to an embodiment, when the voltage is applied to the grid, the grid voltage may be the same as the actual load voltage.

According to an embodiment, the grid power failure determiner 216 may identify the grid power failure based on the at least one of the amplitude or the frequency of the grid voltage (or the actual load voltage). Alternatively, when the voltage (or the frequency) that is lower than the rated voltage (or rated frequency) is detected, the voltage controller 212 may perform voltage control to adjust the actual voltage to be equal to the command voltage.

For example, if the reference rated voltage is 100 V and the grid voltage ranges from 88 to 110 V, the grid power failure determiner 216 may identify that the grid is in a stable state (e.g., a non-power failure state).

For example, if the reference rated voltage is 100 V and the grid voltage is less than 88V or exceeds 110 V, the grid power failure determiner 216 may identify that the grid is in an unstable state (e.g., the power failure state).

According to an embodiment, the grid phase detector (PLL) 217 may adjust the frequency of the output signal to correspond to that of the input signal. The grid phase detector 217 may control the output signal based on a phase difference between the input signal and the output signal. The grid phase detector 217 may detect the phase difference between the input signal input to the grid phase detector 217 and the output signal output from the grid phase detector 217 and determine the detected phase difference as a phase deviation.

In addition, the grid phase detector 217 may change output frequency by adjusting input voltage (e.g., grid voltage) to reduce the phase deviation. The grid phase detector 217 is in a phase-locked state when the phases between the input signal and the output signal are synchronized and may adjust the output frequency with respect to the input voltage to maintain the phase-locked state. The grid phase detector 217 may detect grid voltage and adjust a phase of the detected voltage.

According to an embodiment, when the grid power failure determiner 216 identifies that the power failure occurs in the grid, the processor 218 adjusts first frequency (e.g., 60 Hz) of the grid voltage to second frequency (e.g., 55 Hz) and transmits the second frequency to the second switch 219.

According to an embodiment, the output of the power controller 211 and the output of the voltage controller 212 may be transmitted to the current controller 214 based on the switching operation of the first switch 213. The first switch 213 may be disposed at an output terminal of the power controller 211 and an output terminal of the voltage controller 212.

When the grid power failure determiner 216 identifies that the power failure occurs in the grid (or the grid is in the unstable state), the first switch 213 may receive, from the grid power failure determiner 216, the power failure detection signal indicating that the power failure occurs. The first switch 213 may perform the switching operation under the control of the processor 218 to electrically connect the power controller 212 to the current controller 214.

According to an embodiment, frequency information on frequency adjusted by the grid phase detector 217 and frequency information on frequency (e.g., 55 Hz) adjusted by the processor 218 may be transmitted to the three-phase command voltage generator 215 based on the switching operation of the second switch 219. The second switch 219 may be disposed at an output terminal of the grid phase detector 217 and an output terminal of the processor 218.

In addition, when the grid power failure determiner 210 identifies that the power failure occurs in the grid (or the grid is in the unstable state), the second switch 219 may receive, from the grid power failure determiner 216, the power failure detection signal indicating that the power failure occurs. In addition, the second switch 219 may perform the switching operation under the control of the processor 218 to electrically connect the processor 218 to the three-phase command voltage generator 215.

According to an embodiment, the three-phase voltage generator 215 may generate three-phase command voltage based on the frequency information on frequency adjusted by the grid phase detector 217 and the frequency information on frequency (e.g., 55 Hz) adjusted by the processor 218. The three-phase command voltage has frequency of 55 Hz. Alternatively, the three-phase command voltage may have frequency that is different from frequency (e.g., 60 Hz) of the command voltage.

According to an embodiment, the three-phase command voltage generator 215 may generate voltage having frequency (e.g., 50 Hz, 55 Hz, 65 Hz, or 70 Hz) that is different from frequency (e.g., 60 Hz) of the command voltage based on the frequency information on frequency adjusted by the grid phase detector 217 and the frequency information on frequency (e.g., 55 Hz) adjusted by the processor 218.

According to an embodiment, the three-phase command voltage generator 215 may control the operation of the PCS 110 based on the three-phase voltage having the adjusted frequency.

According to an embodiment, the processor 218 may identify whether the power failure occurs in the grid based on the at least one of the amplitude or the frequency of the grid voltage detected by the grid power failure determiner 216. The processor 218 may identify that the power failure occurs in the grid based on the grid voltage having an amplitude value outside of a predetermined amplitude range (e.g., 88% to 110%) of the reference rated voltage.

According to an embodiment, the processor 218 may identify that the power failure occurs in the grid based on the frequency of the grid voltage (e.g., 60 Hz) being outside of a predetermined range (e.g., 59.3 to 60.5 Hz). The predetermined voltage range (e.g., 88% to 110%) and the predetermined frequency range (e.g., 59.3 Hz to 60.5 Hz) may each be variably adjusted in consideration of performance of the PCS 100, performance of the system 100 configured to synchronize power failure detection among the PCSs, and an effect of load on the power grid.

According to an embodiment, the voltage controller 212 may obtain, from the EMS, the command voltage (e.g., 220 V) having predetermined frequency (e.g., 60 Hz). The voltage controller 212 may obtain the actual load voltage measured at the load line while the PCS 110 is operating. The load voltage may include voltage consumed by the load connected to the power line 180.

According to an embodiment, when the grid is identified to be blacked out, the processor 218 may control the voltage controller 212 to control (or adjust) the voltage for adjusting the load voltage input to the voltage controller 212 to be equal to the command voltage (e.g., the command voltage received from the EMS). The processor 218 may control the voltage controller 212 to perform the voltage control for adjusting the actual load voltage to the command voltage (e.g., 220 V). The command voltage is used to operate the PCS 110 and the processor 218 may operate the PCS 110 based on the command voltage (e.g., 220 V).

According to an embodiment, the processor 218 may operate the PCS by adjusting the first frequency of the grid voltage to second frequency that is different from the first frequency. The processor 218 may control the grid power failure determiner 216 to identify whether the power failure occurs in the grid or not.

According to an embodiment, the processor 218 may identify that the power failure occurs in the grid based on the grid voltage has an amplitude value being outside of the predetermined amplitude range of the reference rated voltage. In addition, the processor 218 may identify that the power failure occurs in the grid based on the frequency of the grid voltage being outside of the predetermined range.

According to an embodiment, when the grid power failure determiner 260 identifies that the power failure occurs in the grid, the processor 218 controls the first switch 213 to electrically connect the power controller 211 to the current controller 214. In addition, when the grid power failure determiner 260 identifies that the power failure occurs in the grid, the processor 218 controls the second switch 219 to electrically connect the grid phase detector 217 to the three-phase command voltage generator 215.

According to an embodiment, when the grid power failure determiner 216 identifies that the power failure occurs in the grid, the processor 218 may adjust the first frequency (e.g., 60 Hz) of the grid voltage to the second frequency (e.g., 55 Hz). The processor 218 may transmit, to the three-phase command voltage generator 215, the voltage having the second frequency (e.g., 55 Hz) adjusted from the first frequency based on the switching operation of the second switch 219.

According to an embodiment, the processor 218 controls the three-phase command voltage generator 215 to generate three-phase command voltage having the second frequency (e.g., 55 Hz) and apply the generated three-phase command voltage to the power line 180. The processor may apply the three-phase command voltage having the second frequency to the power line 180 to identify the grid power failure by the adjacent another PCS (e.g., at least one of the second PCS 120 or the third PCS 130) after the PCS (e.g., the first PCS 110) detects the power failure state (or the unstable state) of the grid.

According to an embodiment, the processor 218 applies the three-phase command voltage having the second frequency to the power line 180 and controls the PCS (e.g., the first PCS 110) to independently operate the PCS (e.g., the first PCS 110). For example, the processor 218 controls the PCS (e.g., the first PCS 110) to be independently operated for a predetermined time period. For example, the processor 21 controls the PCS (e.g., the first PCS 110) to be independently operated until the grid power is restored (e.g., the grid power failure is resolved or a state of the grid is changed to be a stable state).

Figure 3:
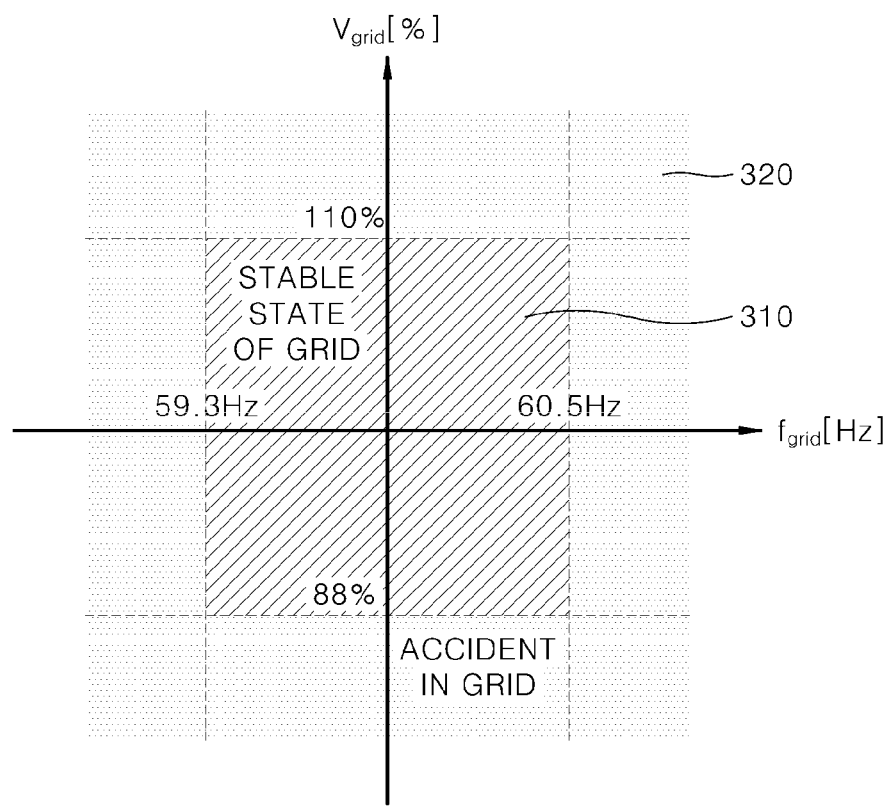
FIG. 3 is an exemplary diagram showing frequency with respect to amplitude of grid voltage used to identify whether the grid is in a stable state.

FIG. 3 is an exemplary diagram showing frequency with respect to amplitude of grid voltage for identifying that the grid is in a stable state.

Referring to FIG. 3, a PCS 110 (e.g., the processor 218) may identify that the power failure occurs in the grid based on at least one of amplitude or frequency of grid voltage detected by a grid power failure determiner 216 of the PCS 110.

According to an embodiment, when the PCS 110 (e.g., the processor 218) may identify that the grid is in the stable state (e.g., a non-power failure state) 310 based on the grid voltage measured by the grid power failure determiner 216 being ranging from 88 to 110 V in a predetermined range (e.g., 88 to 110%) with respect to reference voltage (e.g., 100V).

According to an embodiment, based on the frequency of the grid voltage measured by the grid power failure determiner 216 being less than a predetermined range (e.g., 59.3 Hz to 60.5 Hz), the PCS 110 (e.g., the processor 218) may identify that the grid is in the stable state (e.g., the non-power failure state) 310.

According to an embodiment, the PCS 110 (e.g., the processor 218) may identify that the power failure occurs in the grid or the grid is in the unstable state 320 based on the grid voltage measured by the grid power failure determiner 216 outside of a predetermined range (e.g., a range less than 88 V (e.g., 88%) or exceeding 110 V (e.g., 110%) with respect to predetermined voltage (e.g., 100 V).

According to an embodiment, the PCS 110 (e.g., the processor 218) may identify that the grid is in the unstable state (e.g., the power failure state) 320 based on the frequency (e.g., 60 Hz) of the grid voltage measured by the grid power failure determiner 216 being outside of the predetermined range (e.g., a range less than 59.3 Hz or exceeding 60.5 Hz).

Figure 4:
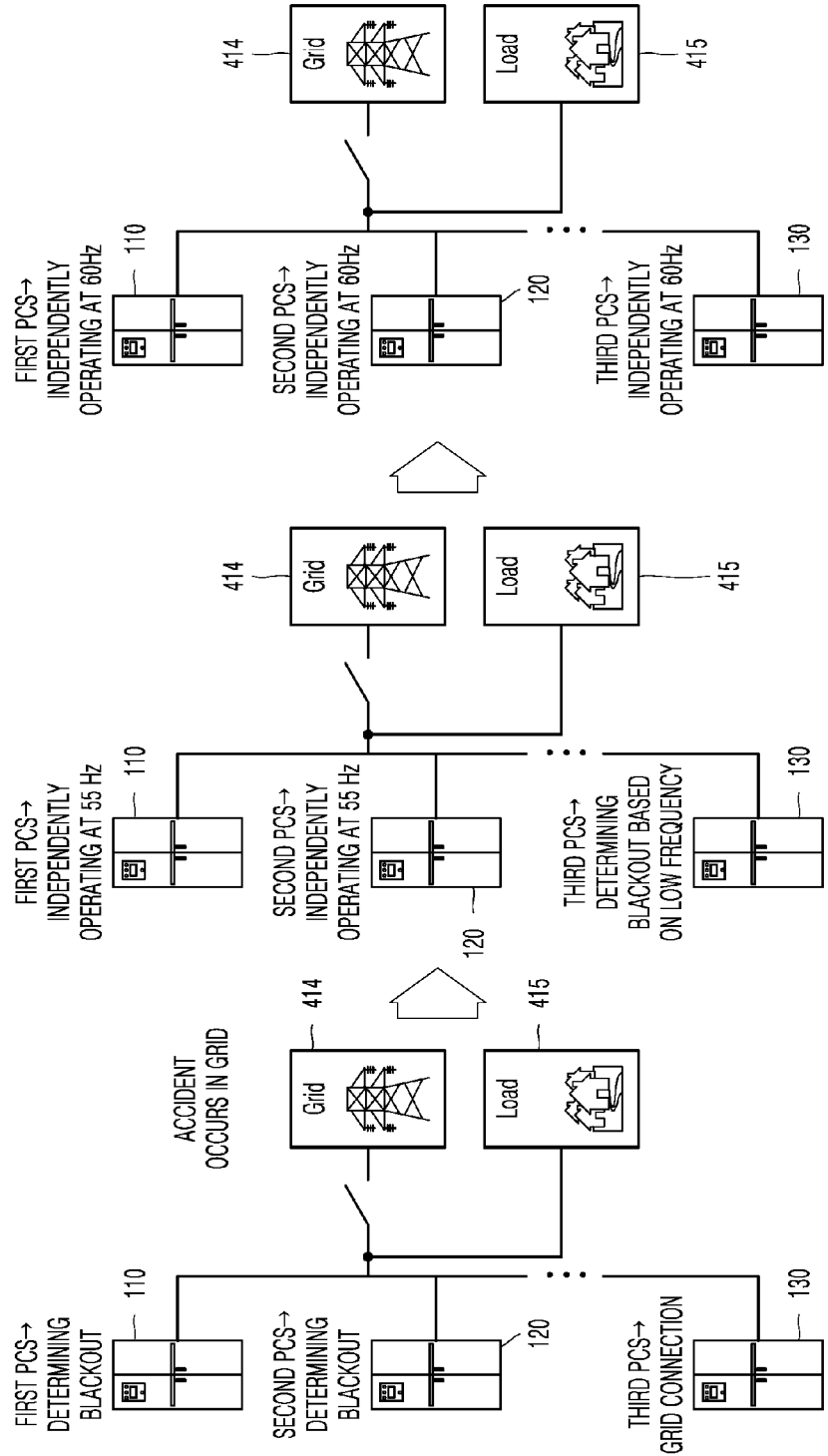
FIG. 4 is an exemplary diagram showing an example of at least one PCS detecting power failure and performing an independent operation when a plurality of PCSs are electrically connected to one another in a micro grid.

FIG. 4 is an exemplary diagram showing an example of at least one PCS identifying power failure and performing an independent operation when a plurality of PCSs are electrically connected to a micro grid.

According to FIGS. 2 and 3, the first PCS 110 identifies the power failure state (or the unstable state) of the grid and controls the at least one of the second PCS 120 or the third PCS 130 to identify the grid power failure. In the present disclosure, at least two PCSs (e.g., the first PCS 110 and the second PCS 120) identify the power failure state or the unstable state of the grid and control the other PCS (e.g., the third PCS 130) to identify the grid power failure.

Referring to FIG. 4, a first PCS 110 and a second PCS 120 may identify the power failure state (or an unstable state) of the grid simultaneously (or with a negligible time difference). For example, if the power failure state (or the unstable state) occurs in a grid 414, the first PCS 110 and the second PCS 120 may identify the power failure of the grid 414 simultaneously (or with the negligible time difference).

According to an embodiment, when the power failure state (or the unstable state) occurs in the grid 414, power is not supplied to a load 415. When the power failure occurs in the grid 414, at least one of the first PCS 110 or the second PCS 120 is operated at low frequency (e.g., 55 Hz) and may control at least one other PCS (e.g., the third PCS 130) to identify that the power failure occurs in the grid 414 (or is in the unstable state).

According to an embodiment, the at least one of the first PCS 110 or the second PCS 120 may convert first frequency of grid voltage to second frequency and operate in an independent operation mode for a predetermined time period for which the other PCS (e.g., the third PCS 130) may detect the low frequency (e.g., 55 Hz).

In addition, when the other PCS (e.g., the third PCS 130) detects the low frequency (e.g., 55 Hz), the at least one of the first PCS 110 or the second PCS 120 may be operated in the independent operation mode based on rated frequency (e.g., 60 Hz). In addition, the at least one of the first PCS 110 or the second PCS 120 may be operated in the independent operation mode at rated frequency (e.g., 60 Hz) based on the power failure detection of the other PCS (e.g., the third PCS 130).

Figure 5:
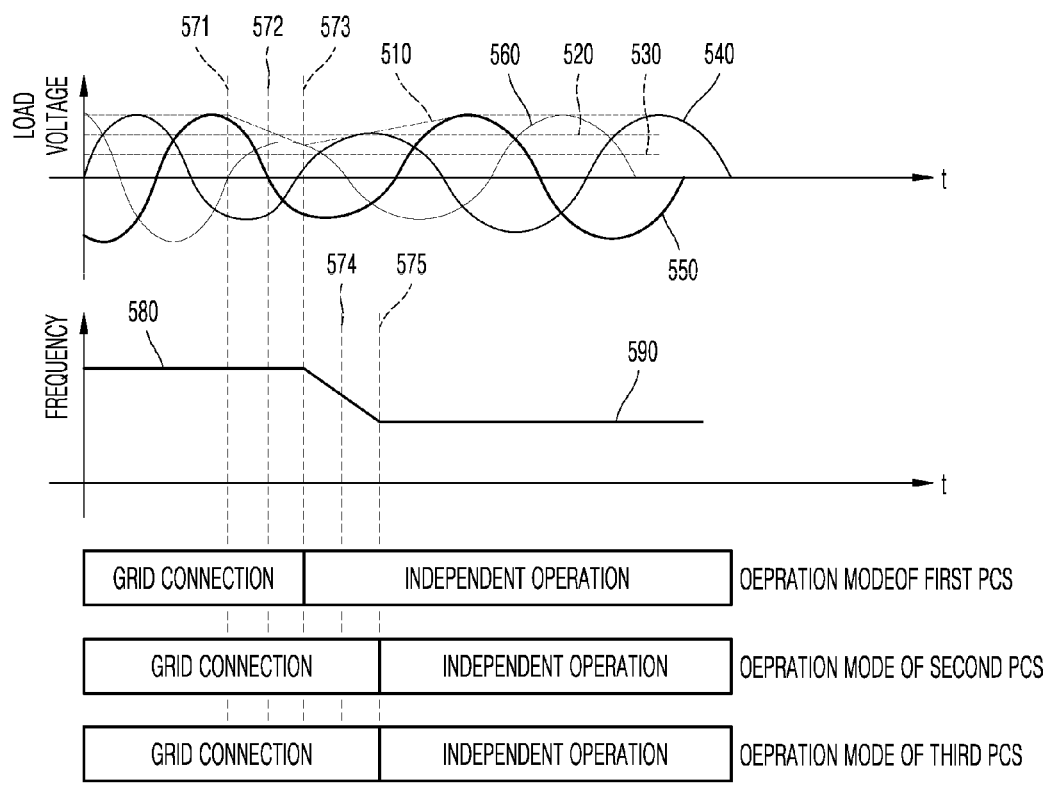
FIG. 5 is an exemplary diagram showing an example of a PCS synchronizing power failure detection with other PCSs.

FIG. 5 is an exemplary diagram showing an example of a PCS synchronizing power failure detection with other PCSs.

Referring to FIG. 5, when power failure occurs in a grid, grid voltage (e.g., actual load voltage) 510 may be reduced to first voltage 520 for identifying, by a first PCS 110, that the power failure occurs in the grid. The first PCS 110 may identify that the power failure occurs in the grid based on the grid voltage being less than the first voltage 520. When the first PCS 110 identifies that the power failure occurs in the grid, the first PCS 110 may convert first frequency 580 (e.g., 60 Hz) of the grid voltage 510 to second frequency 590 (e.g., 55 Hz) and apply the grid voltage 510 having the converted frequency to a power line 180. The grid voltage having the converted frequency may be output to three-phase command phase by a three-phase command voltage generator 215 and phases 540, 550, and 560 of the three-phase command voltage has a phase deviation of 120°.

According to an embodiment, at least one of a second PCS 120 or a third PCS 130 may identify that the power failure occurs in the grid based on the grid voltage being less than the second voltage 530. Based on the grid voltage being less than the second voltage 530, the first PCS 110 identifies that the power failure occurs in the grid and controls the at least one of the second PCS 120 or the third PCS 130 to identify the grid power failure.

Alternatively, when the grid voltage is less than the second voltage 530, the at least one of the second PCS 120 or the third PCS 130 may identify the power failure before the first PCS 110 controls the at least one of the second PCS 120 or the third PCS 130 to identify the grid power failure.

According to an embodiment, when the power failure occurs in the grid at a first time 571, the first PCS 110 may identify that the power failure occurs in the grid at a second time 572. If the grid voltage is less than the first voltage 520 at a third time 573, the first PCS 110 may convert the first frequency 580 of the grid voltage to the second frequency 590. In this case, the at least one of the second PCS 120 or the third PCS 130 may detect the second frequency (e.g., 55 Hz) of first power that is less than frequency configured such that the first PCS 110 to the third PCS 130 identify the power failure at a fourth time 574. In addition, an operation mode of the at least one of the second PCS 120 or the third PCS 130 may be switched to an independent operation mode at a fifth time 575.

According to an embodiment, the first PCS 110 may operate in connection with the grid until the third time 573 and operate in the independent operation mode after the third time 573. The second PCS 120 and the third PCS 130 may each operate in connection with the grid until the fifth time 575 and operate in the independent operation mode after the fifth time 575.

Figure 6:
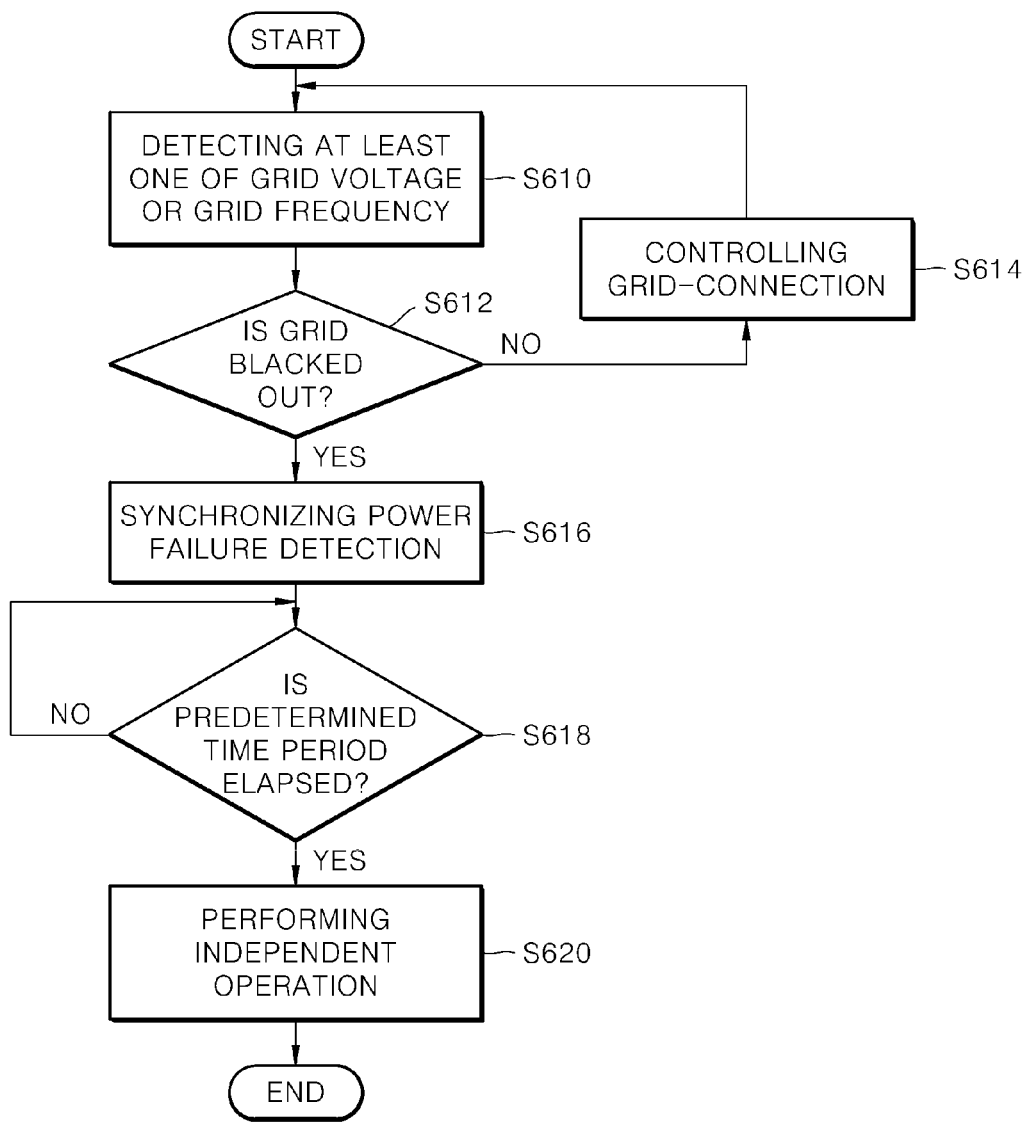
FIG. 6 is a flowchart showing an example method for detecting power failure and performing an independent operation by a PCS.

FIG. 6 is a flowchart showing an example method for detecting power failure and performing an independent operation by a PCS.

Hereinafter, a method for detecting the power failure and performing the independent operation by the PCS is described in detail with reference to FIG. 6.

According to an embodiment, a PCS 110 (e.g., a grid power failure determiner 216) may detect at least one of voltage or frequency of grid (S610). The PCS 110 (e.g., the grid power failure determiner 216) analyzes the at least one of amplitude or the frequency of the grid voltage (or actual load voltage) and identifies whether the grid is currently in a power failure state or a non-power failure state based on the analysis of the at least one of the amplitude or the frequency of the grid voltage (or the actual load voltage).

The PCS 110 (e.g., the grid power failure determiner 216) detects the amplitude of the grid voltage, and based on the detected amplitude of the grid voltage being outside of a predetermined amplitude range (e.g., 88% to 110%) of reference rated voltage, the PCS 110 (e.g., the grid power failure determiner 216) may identify that the power failure occurs in the grid. The grid power failure determiner 216 may transmit, to a processor 218, a signal indicating that the power failure occurs in the grid.

According to an embodiment, the PCS 110 (e.g., a processor 218) may identify whether the power failure occurs in the grid (or the grid is in an unstable state) based on the at least one of the detected voltage or frequency of the grid (S612).

According to an embodiment, when reference rated voltage of the PCS 110 is 100 V and the grid voltage is 88 to 110 V, the PCS 110 (e.g., the grid power failure determiner 216) may identify that the grid is in a stable state (e.g., a non-power failure state).

According to an embodiment, when the reference rated voltage is 100 V and the grid voltage is less than 88 V or exceeds 110 V, the PCS 110 (e.g., the grid power failure determiner 216) may identify that the grid is in the unstable state (e.g., the power failure state).

According to an embodiment, the reference rated voltage may be variably adjusted based on performance and the state of the PCS 110.

According to an embodiment, the PCS 110 (e.g., the grid power failure determiner 216) may identify that the grid is in the stable state (e.g., the non-power failure state) based on the frequency (e.g., 60 Hz) of the grid voltage measured by the grid power failure determiner 216 being within a predetermined range (e.g., 59.3 to 60.5 Hz).

According to an embodiment, the PCS 110 (e.g., the grid power failure determiner 216) may identify that the grid is in the unstable state (e.g., the non-power failure state) based on the frequency (e.g., 60 Hz) of the grid voltage measured by the grid power failure determiner 216 being outside of a predetermined range (e.g., a predetermined range less than 59.3 Hz or exceeding 60.5 Hz).

According to an embodiment, the PCS 110 (e.g., the processor 218) measures at least one of the detected grid voltage or the detected grid frequency once and compares the at least one of the measured voltage or the measured frequency with a corresponding threshold value (or a range) to identify the state of the grid (e.g., the power failure state or the non-power failure state). Alternatively, the PCS 110 (e.g., the processor 218) may measure the at least one of the detected voltage and detected frequency of the grid a plurality of times or measure it a plurality of times for the predetermined time period to calculate an average value thereof.

In addition, the PCS 110 (e.g., the processor 218) compares the average value of the at least one of the voltage or frequency measured the plurality of times with a threshold value (or a threshold range) thereof to identify the grid state (e.g., the power failure state/the non-power failure state or the unstable state/the stable state).

Alternatively, if the value thereof measured once maintains the threshold value (or the threshold range) for the predetermined period of time, the PCS 110 (e.g., the processor 218) may identify that the grid is in the power failure state or the unstable state as shown in [Table 1] below.

TABLE 1

| Reference voltage (e.g., 100 V) | Reference frequency (e.g., 60 Hz) | Time (sec) |
|---|---|---|
| Grid voltage in a range from 80 to 90% of reference voltage level | Grid frequency in a range from 80 to 90% of reference frequency level | 10 s |

TABLE 1-continued

| Reference voltage (e.g., 100 V) | Reference frequency (e.g., 60 Hz) | Time (sec) |
|---|---|---|
| Grid voltage in a range from 70 to 80% of reference voltage level | Grid frequency in a range from 60 to 80% of reference frequency level | 0.5 s |
| Grid voltage in a range 0 to 70% of reference voltage level | Grid frequency in a range from 0 to 70% of reference frequency level | 20 ms |

As shown in [Table 1], the PCS 110 may identify that the grid is in the power failure state or the unstable state when the measured grid voltage is maintained in the range from 80 to 90% of the reference voltage (e.g., 100 V) for 10 seconds (sec). In addition, the PCS 110 may identify that the grid is in the power failure state or the unstable state when the measured grid voltage is maintained for 0.5 seconds (sec) in the range from 70 to 80% of the reference voltage (e.g., 100 V). In addition, the PCS 110 may identify that the grid is in the power failure state or the unstable state when the measured grid voltage is maintained in the range from 0 to 70% of the reference voltage (e.g., 100 V) for 20 ms (sec). As the ratio of the grid voltage to the reference voltage is lower, the predetermined time period may be shorter.

In addition, the PCS 110 may identify that the grid is in the power failure state or the unstable state when the measured frequency of the grid voltage is maintained in the range from 80 to 90% of the reference frequency level (e.g., 60 Hz) for 10 seconds (sec). In addition, the PCS 110 may identify that the grid is in the power failure state or the unstable state when the measured frequency of the grid voltage is maintained in the range from 60 to 80% of the reference frequency level (e.g., 60 Hz) for 0.5 seconds (sec).

In addition, the PCS 110 may identify that the grid is in the power failure state or the unstable state when the measured frequency of the grid voltage is maintained in the range from 0 to 70% of the reference frequency level (e.g., 60 Hz) for 20 ms (sec). The ratios and the time periods may each be variably adjusted.

According to an embodiment, when the PCS 110 identifies that the power failure does not occur in the grid, the PCS 110 (e.g., the processor 218) may control the grid-connection (S614). Based on the at least one of the grid voltage (e.g., 100 V) or the grid frequency (e.g., 60 Hz) measured by the grid power failure determiner 216 being falling within a threshold range of the at least one of the voltage or the frequency (e.g., for voltage, a range from about 88 to 110 V and for frequency, a range from about 59.3 to 60.5 Hz), the PCS 110 (e.g., the processor 218) may identify that the grid is in the stable state. In addition, when the PCS 110 identifies that the grid is in the stable state, the PCS 110 (e.g., the processor 218) may perform the grid-connection control operation based on the power received from the grid.

According to an embodiment, the PCS 110 (e.g., the processor 218) may synchronize power failure detection (S616). Based on the at least one of the grid voltage (e.g., 100 V) or the grid frequency (e.g., 60 Hz) measured by the grid power failure determiner 216 being not falling within a threshold range of the at least one of the voltage or the frequency (e.g., a voltage range from about 88 to about 110 V and a frequency range from about 59.3 to 60.5 Hz), the PCS 110 (e.g., the processor 218) may identify that the grid is in the unstable state (e.g., the power failure state).

According to an embodiment, the PCS 110 (e.g., the processor 218) may perform power failure detection synchronization with other PCSs 120 and 130 adjacent to the PCS 110. The power failure detection synchronization process may include applying power having low frequency (e.g., 65 Hz) to the power line 180 in order for the PCS 110 (e.g., the processor 218) to control the other PCSs 120 and 130 for detecting the power failure.

According to an embodiment, the PCS 110 (e.g., the processor 218) may identify whether a predetermined time period is elapsed (S618). The PCS 110 (e.g., the processor 218) may determine that the predetermined time period (e.g., 3 seconds) is elapsed for which, after the PCS 110 (e.g., the processor 218) performs the power failure detection synchronization, the PCS 110 (e.g., the processor 218) controls the at least one of adjacent other PCSs 120 and 130 to identify the power failure state or the unstable state of the grid. The predetermined time period (e.g., 3 seconds) may be variably adjusted based on a distance among the PCSs or a situation of a system 100 configured to synchronize power failure detection among the PCSs.

According to an embodiment, the system 100 configured to synchronize the power failure detection among the PCSs may be connected through a signal line for transmitting and receiving signals among the PCSs. For example, the PCSs may transmit and receive a signal indicating the power failure state or the unstable state of the grid through the signal line.

For example, when the at least one of the other PCSs 120 and 130 detects the voltage having the frequency converted by the PCS 110, the at least one of the other PCSs 120 and 130 may identify that the grid is in the power failure state or the unstable state. The at least one of the other PCSs 120 and 130 may transmit, to the PCS 110 and through the signal line, a response signal indicating the detection of the power failure state or the unstable state thereof when the at least one of the other PCSs 120 and 130 identify that the grid is in the power failure state or the unstable state.

According to an embodiment, the PCS 110 (e.g., the processor 218) may perform an independent operation (S620). The PCS 110 (e.g., the processor 218) adjusts the first frequency (e.g., 60 Hz) of the grid voltage to second frequency (e.g., 55 Hz), and after an elapse of the predetermined time period (e.g., 3 seconds) for which the PCS 110 (e.g., the processor 218) may identify that the grid is in the power failure state or the unstable state based on the second frequency that does not fall within the frequency predetermined range, the PCS 110 (e.g., the processor 218) may be operated in the independent operation mode.

According to an embodiment, the other PCSs 120 and 130 that have detected the voltage having the low frequency (e.g., 65 Hz) may operate in the independent operation mode, similar to the PCS 110.

According to an embodiment, based on the elapse of the predetermined time period (e.g., 3 seconds) for which the at least one of the other adjacent PCSs 120 and 130 identifies the power failure state or the unstable state of the grid after the PCS 110 (e.g., the processor 218) performs the power failure detection synchronization, the PCS 110 (e.g., the processor 218) may be independently operated at 60 Hz.

The independent operation may include an operation of supplying power charged in the battery of the PCS 110 to a load electrically connected to the PCS 110. The PCS 110 (e.g., the processor 218) may perform the independent operation until the power failure state or the unstable state of the grid is resolved.

Figure 7:
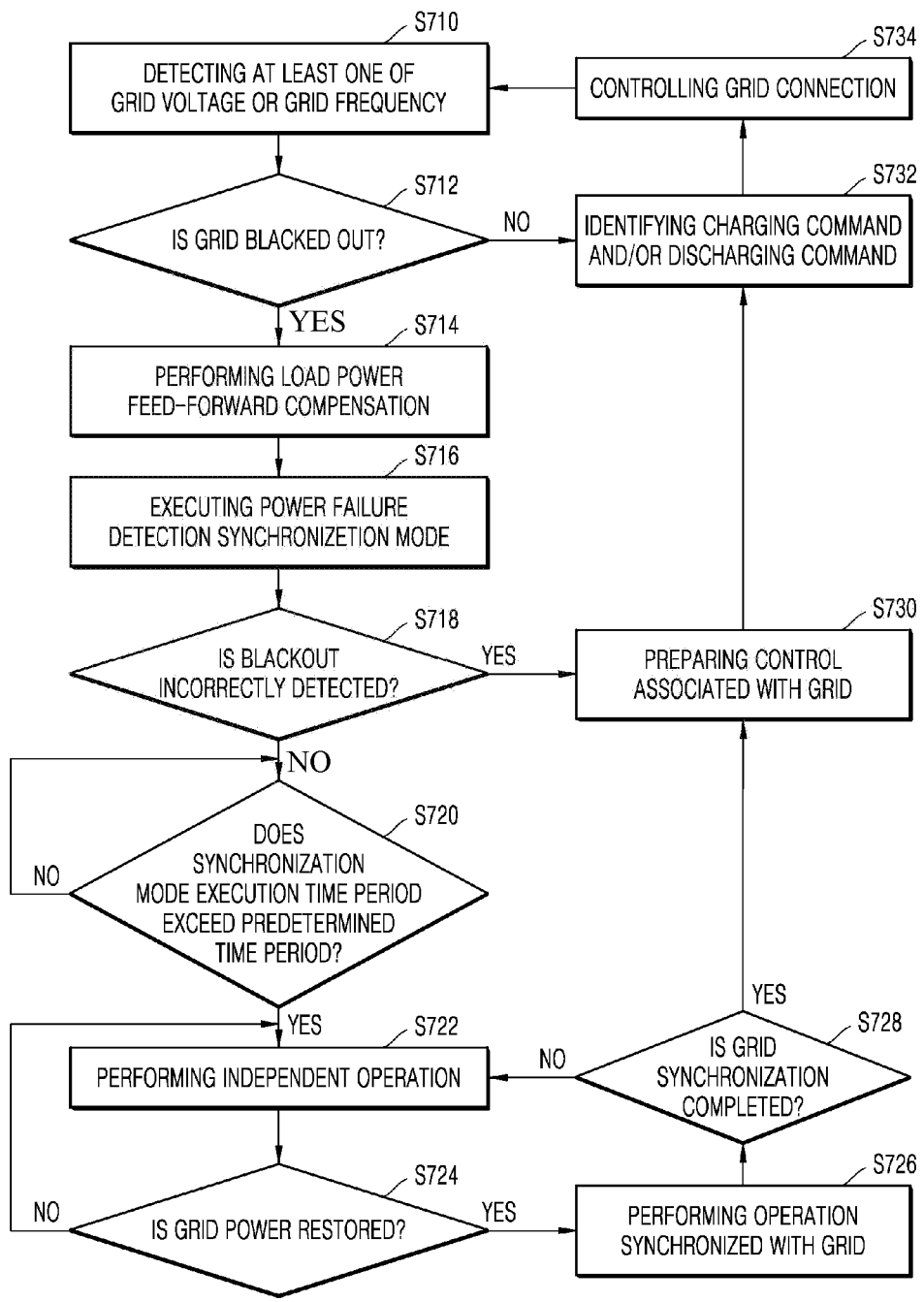
FIG. 7 is a flowchart showing an example method for detecting power failure and performing an independent operation by a PCS.

FIG. 7 is a flowchart showing an example method for detecting power failure and performing an independent operation by a PCS.

Referring to FIG. 7, the method for detecting the power failure and performing the independent operation by the PCS is described in detail.

According to an embodiment, a PCS 110 (e.g., a grid power failure determiner 216) may detect at least one of grid voltage or grid frequency (S710). The PCS 110 (e.g., the grid power failure determiner 216) analyzes at least one of amplitude or frequency of the grid voltage (or actual load voltage) to identify whether the grid is currently in a power failure state or a non-power failure state. The S710 may include the operation or the step performed at the S610 of FIG. 6.

According to an embodiment, the PCS 110 (e.g., the grid power failure determiner 216) compares a magnitude of reference rated voltage (e.g., 100 V) with a magnitude of grid voltage, and when the grid voltage does not fall within a predetermined range (e.g., when the grid voltage is less than 88 V or exceeds 110 V), the PCS 110 may identify that the grid is in an unstable state (e.g., the power failure state).

In addition, based on the frequency (e.g., 60 Hz) of the grid voltage being outside of a predetermined range (e.g., being less than 59.3 Hz or exceeding 60.5 Hz), the grid power failure determiner 216 may determine that the grid is in the unstable state (e.g., the non-power failure state). The S712 may include the operation or the process performed at the S612 of FIG. 6.

According to an embodiment, the PCS 110 (e.g., a processor 218) may perform load power feed-forward compensation (S714). When the PCS 110 (e.g., the processor 218) identify that the grid is in the power failure state or the unstable state at S712, the PCS 110 (e.g., the processor 218) may determine that the PCS 110 may supply the power to at least one load. The PCS 10 (e.g., the processor 218) may control the operations of the components of the PCS 110 to supply the power stored in the battery to the at least one load.

According to an embodiment, the PCS 110 (e.g., the processor 218) may execute a power failure detection synchronization mode (S716). The PCS 110 (e.g., the processor 218) may perform the power failure detection synchronization process with at least one of other PCSs 120 and 130 adjacent to the PCS 110. The power failure detection synchronization process may include applying the power having low-frequency (e.g., 65 Hz) to a power line 180 in order for the at least one of other PCSs 120 and 130 to detect the power failure under the control of the PCS 110 (e.g., the processor 218).

In addition, the power failure detection synchronization process may include detecting the power failure state or the unstable state of the grid by the at least one of the PCS 120 or the PCS 130 under the control of the PCS 110 and transmitting detection response to the PCS 110.

According to an embodiment, the PCS 110 (e.g., the processor 218) may determine whether the power failure state is incorrectly determined (S718). The PCS 110 (e.g., the processor 218) may periodically check the power failure state or the unstable state of the grid. The PCS 110 (e.g., the processor 218) may periodically check the power failure state or the unstable state of the grid to determine whether the PCS 110 incorrectly determined the power failure state or the unstable state of the grid. Based on identifying that the power failure was incorrectly detected, the PCS 110 (e.g., the processor 218) may prepare a grid-connected control operation.

According to an embodiment, the PCS 110 (e.g., the processor 218) may determine whether an execution time period of the power failure detection synchronization mode exceeds a predetermined time period (S720). Based on the determination that the power failure state or the unstable state of the grid is not incorrectly detected at S718, the PCS 110 (e.g., the processor 218) may determine that the execution time period of the power failure detection synchronization mode exceeds the predetermined time period.

According to an embodiment, the PCS 110 (e.g., the processor 218) may operate a timer while executing the power failure detection synchronization mode. In addition, the PCS 110 (e.g., the processor 218) may measure the time period for which the power failure detection synchronization mode is executed and compare the measured time period with a predetermined time period (e.g., 3 seconds).

According to an embodiment, the predetermined time period (e.g., 3 seconds) may be a time period for which the PCS 110 is operated in the power failure detection synchronization mode or a time period for which the at least one of adjacent PCSs 120 or 130 detects the power failure and operates in an independent operation mode. The predetermined time period (e.g., 3 seconds) may be variably adjusted based on the distance among the PCSs or the situation of the system 100 configured to synchronize power failure detection among the PCSs.

According to an embodiment, the PCS 110 (e.g., the processor 218) may perform an independent operation (S722). Based on determining that the execution time period of the power failure detection synchronization mode exceeds the predetermined time period, the PCS 110 (e.g., the processor 218) may operate the PCS 110 in the independent operation mode.

According to an embodiment, the PCS 110 (e.g., the processor 218) may identify whether the grid power is restored (S724). The PCS 110 (e.g., the processor 218) may periodically check whether the grid power is restored while operating in the independent operation mode. The PCS 110 (e.g., the processor 218) may identify whether the grid power is restored by detecting the grid voltage or the grid frequency.

According to an embodiment, the PCS 110 (e.g., the processor 218) may perform an operation synchronized with the grid (S726). Based on identifying that the grid power is restored, the PCS 110 (e.g., the processor 218) may perform the operation synchronized with the grid. Alternatively, based on identifying that the grid power is not restored, the PCS 110 (e.g., the processor 218) may continuously perform the independent operation at S722.

According to an embodiment, the PCS 110 (e.g., the processor 218) may determine whether the synchronization with the grid has been completed (S728). When the grid power is restored, the PCS 110 (e.g., the processor 218) may perform a series of processes (e.g., grid synchronization operation) of receiving the power of the at least one load from the grid.

According to an embodiment, the PCS 110 (e.g., the processor 218) may prepare control associated with the grid (S730). When the synchronization with the system is completed, the PCS 110 (e.g., the processor 218) may prepare a control operation associated with the grid. Based on the synchronization with the grid being completed, the PCS 110 (e.g., the processor 218) may control the operation of each component of the PCS 110 to receive the power from the grid. Based on the synchronization with the grid being not completed, the PCS 110 (e.g., the processor 218) may continuously execute the independent operation of the process (S722).

According to an embodiment, the PCS 110 (e.g., the processor 218) may prepare the control operation associated with the grid based on the determination of the PCS 110

(e.g., the processor 218) that the power failure is incorrectly detected at S718. Based on the determination of the PCS 110 (e.g., the processor 218) that the power failure is incorrectly detected, the PCS 110 (e.g., the processor 218) may cancel the execution of the power failure detection synchronization mode performed at S716. Subsequently, the PCS 110 (e.g., the processor 218) may control the operation of each of the components of the PCS 110 to be operated in association with the grid.

According to an embodiment, the PCS 110 (e.g., the processor 218) may identify a charging command and/or discharging command (S732). The PCS 110 (e.g., the processor 218) may identify the charging command and/or the discharging command from an energy management system (EMS). The EMS may transmit the charging command and/or the discharging command to the PCS 110 to monitor and control an operation method of the PCS 110. The EMS may analyze the PCS 110 in real time, and monitor and control the PCS 110 through a communication network.

According to an embodiment, the PCS 110 (e.g., the processor 218) may be connected to the grid and operated (S734). The PCS 110 (e.g., the processor 218) may receive the charging command or the discharging command and perform the operation associated with the grid based on the received command.

The magnitude of the voltage and the magnitude of the frequency described above are only an example. The power failure state or the unstable state may be identified based on the voltage and the frequency each having various magnitudes and the PCSs may synchronize the detection of the power failure state or the unstable state. In addition, the magnitude of the voltage and the frequency set forth herein may be adjusted to another magnitude of voltage or frequency.

Each step in each of the flowcharts described above may be operated irrespective of the illustrated sequence, or may be performed simultaneously. In addition, at least one component of the present disclosure and at least one operation performed by the at least one component may be implemented with hardware and/or software.

Although the present disclosure has been described as described above with reference to exemplary drawings, the present disclosure is not limited to the embodiments and drawings disclosed herein, and various modifications can be made by those skilled in the art within the scope of the technical idea of the present disclosure. In addition, even if working effects obtained based on configurations of the present disclosure are not explicitly described in the description of embodiments of the present disclosure, effects predictable based on the corresponding configuration have to be recognized.

DESCRIPTION OF SYMBOLS

110: First power conditioning system
111: First transformer
120: Second power conditioning system
121: Second transformer
140: Grid
180: Micro grid
211: Power controller
212: Voltage controller
213: First switch
214: Current controller
215: Three-phase command voltage generator
216: Grid power failure determiner
217: Grid phase detector
218: Processor
219: Second switch

What is claimed is:

1. A power conditioning system (PCS), comprising:
a grid blackout determiner;
a voltage controller;
a three-phase command voltage generator; and
a processor electrically connected to the grid blackout determiner and the voltage controller,
wherein the processor is configured to:
identify a state of a grid as a blackout state or an unstable state based on at least one of an amplitude or a frequency of a voltage of the grid that is detected by the grid blackout determiner,
control the voltage controller to adjust, based on the identified state of the grid being the blackout state or the unstable state, a load voltage input to the voltage controller to be equal to a command voltage, wherein the load voltage includes voltage being consumed by at least one load that is electrically connected to the PCS,
adjust, based on the identified state of the grid being the blackout state or the unstable state, a first frequency of the detected voltage of the grid to a second frequency that is different from the first frequency, and
control the three-phase command voltage generator to generate a three-phase command voltage having the second frequency to identify to at least one other PCS adjacent to the PCS the state of the grid being the blackout state or the unstable state.

2. The PCS of claim 1, further comprising:
a first switch;
a current controller; and
a power controller configured to receive command power from an energy management system (EMS),
wherein the processor is configured to:
control the first switch to electrically connect the power controller to the current controller based on the identified state of the grid being different from the blackout state or the unstable state, and
control the current controller to adjust actual power of the PCS to be equal to the command power.

3. The PCS of claim 2, further comprising:
a second switch; and
a grid phase detector that is configured to detect the voltage of the grid and that is configured to control a phase of output voltage to correspond to a phase of the detected voltage of the grid,
wherein the processor is configured to control, based on the identified state of the grid being different from the blackout state or the unstable state, the second switch to electrically connect the grid phase detector to the three-phase command voltage generator.

4. The PCS of claim 1, wherein the processor is configured to control the grid blackout determiner to identify the state of the grid as the blackout state or the unstable state based on the amplitude of the voltage of the grid being identified to be outside of a predetermined amplitude range of a reference rated voltage.

5. The PCS of claim 1, wherein the processor is configured to control the grid blackout determiner to identify the state of the grid as the blackout state or the unstable state based on the frequency of the voltage of the grid being outside of a predetermined range.

6. The PCS of claim 1, wherein the processor is configured to:
calculate a time period for which the PCS is operated at the second frequency, and
control the PCS to be independently operated at a rated frequency of the at least one load that is electrically connected to the PCS based on the calculated time period exceeding a predetermined threshold time period.

7. The PCS of claim 3, wherein the processor is configured to:
control, based on determining that power of the grid is restored while the PCS is independently operating at a rated frequency, the first switch to electrically connect the power controller to the current controller, and
control the second switch to electrically connect the grid phase detector to the three-phase command voltage generator.

8. The PCS of claim 1,
wherein the PCS and the at least one other PCS adjacent to the PCS are electrically connected through a power line, and
wherein the processor is configured to apply, to the power line, the three-phase command voltage that is generated by the three-phase command voltage generator and that has the second frequency.

9. A method for conditioning power, by a power conditioning system (PCS), comprising:
identifying a state of a grid as a blackout state or an unstable state based on at least one of an amplitude or a frequency of a voltage of the grid;
adjusting, based on the identified state of the grid being the blackout state or the unstable state, a load voltage input to a voltage controller to be equal to a command voltage, wherein the load voltage includes voltage being consumed by at least one load that is electrically connected to the PCS;
adjusting, based on the identified state of the grid being the blackout state or the unstable state, a first frequency of the voltage of the grid to a second frequency, the second frequency being different from the first frequency; and
generating a three-phase command voltage having the second frequency to identify to at least one other PCS adjacent to the PCS the state of the grid being the blackout state or the unstable state.

10. The method of claim 9, wherein the identifying the state of the grid as the blackout state or the unstable state comprises identifying, by a grid blackout determiner of the PCS, the state of the grid as the blackout state or the unstable state based on the amplitude of the voltage of the grid being outside of a predetermined amplitude range of a reference rated voltage.

11. The method of claim 9, wherein the identifying the state of the grid as the blackout state or the unstable state comprises identifying the state of the grid as the blackout state or the unstable state based on the frequency of the voltage of the grid being outside of a predetermined range.

12. The method of claim 9, further comprising:
calculating, by a processor of the PCS, a time period for which the PCS is operated at the second frequency; and
independently operating, by the processor, the PCS at a rated frequency of the at least one load that is electrically connected to the PCS based on the calculated time period exceeding a predetermined threshold time period.

13. The method of claim 9, further comprising:
identifying, by a processor of the PCS, whether power of the grid is restored while the PCS is operating independently;
controlling, by the processor and based on identifying the power of the grid being restored, a first switch to electrically connect a power controller to a current controller; and
controlling, by the processor, a second switch to electrically connect a grid phase detector to a three-phase command voltage generator.

14. The method of claim 9, further comprising applying, to a power line connected to the at least one other PCS adjacent to the PCS, the three-phase command voltage having the second frequency.

15. A system comprising:
a plurality of power conditioning systems (PCSs),
wherein each PCS of the plurality of PCSs comprises:
a grid blackout determiner;
a voltage controller;
a three-phase command voltage generator; and
a processor electrically connected to the grid blackout determiner and the voltage controller,
wherein the processor is configured to:
identify a state of a grid as a blackout state or an unstable state based on at least one of an amplitude or a frequency of a voltage of the grid that is detected by the grid blackout determiner,
control the voltage controller to adjust, based on the identified state of the grid being the blackout state or the unstable state, a load voltage input to the voltage controller to be equal to a command voltage, wherein the load voltage includes voltage being consumed by at least one load that is electrically connected to the PCS,
adjust, based on the identified state of the grid being the blackout state or the unstable state, a first frequency of the detected voltage of the grid to a second frequency that is different from the first frequency, and
control the three-phase command voltage generator to generate a three-phase command voltage having the second frequency to identify to at least one other PCS adjacent to the PCS the state of the grid being the blackout state or the unstable state.

16. The system of claim 15, wherein each PCS of the plurality of PCSs further comprises:
a first switch;
a current controller; and
a power controller configured to receive command power from an energy management system (EMS),
wherein each processor of the plurality of the PCSs is configured to:
control the first switch to electrically connect the power controller to the current controller based on the identified state of the grid of the PCS being different from the blackout state or the unstable state, and
control the current controller to adjust actual power of the PCS to be equal to the command power.

17. The system of claim 16, wherein each PCS of the plurality of PCSs further comprises:
a second switch; and
a grid phase detector that is configured to detect the voltage of the grid and that is configured to control a phase of output voltage to correspond to a phase of the detected voltage of the grid,
wherein each processor of the plurality of the PCSs is configured to control, based on the identified state of the grid being different from the blackout state or the unstable state, the second switch to electrically connect the grid phase detector to the three-phase command voltage generator.

\* \* \* \* \*